United States Patent [19]

Aghili et al.

[11] Patent Number: 4,644,542
[45] Date of Patent: Feb. 17, 1987

[54] FAULT-TOLERANT ATOMIC BROADCAST METHODS

[75] Inventors: Houtan Aghili; Flaviu I. Cristian; Hovey R. Strong, all of San Jose, Calif.

[73] Assignee: International Business Machines Corporation, Armonk, N.Y.

[21] Appl. No.: 661,514

[22] Filed: Oct. 16, 1984

[51] Int. Cl.$^4$ .................. G06F 13/00; G06F 15/16
[52] U.S. Cl. ............................. 371/22; 364/200
[58] Field of Search .............. 371/22, 4, 5; 364/200, 364/900

[56] References Cited

U.S. PATENT DOCUMENTS

| | | | |
|---|---|---|---|
| 4,276,594 | 6/1981 | Morley | 364/200 |
| 4,325,120 | 4/1982 | Colley | 364/200 |
| 4,354,225 | 10/1982 | Frieder | 364/200 |
| 4,418,384 | 11/1983 | Holtey | 371/5 |
| 4,569,015 | 2/1986 | Dolev | 364/200 |

Primary Examiner—Michael R. Fleming
Attorney, Agent, or Firm—R. Bruce Brodie

[57] ABSTRACT

A method for reliably broadcasting information in a point-to-point network of processors in the presence of component faults provided that the network remains connected using only an exchange of messages. The method possesses the properties (1) that every message broadcast by a fault-free processor is accepted exactly once by all fault-free processors within a bounded time, (2) that every message broadcast is either accepted by all fault-free processors or none of them, and (3) that all messages accepted by fault-free processors are accepted in the same order by all those processors.

The method is based on a diffusion technique for broadcasting information and on special message validity tests for tolerating any number of component failures up to network partitioning or successful forgery.

5 Claims, 17 Drawing Figures

THE SEND TASK

THE SEND TASK

THE RECEIVE TASK
(Details of tests T1-T7 are presented in Fig. 2)

| | |
|---|---|
| T1 | Check for message authenticity: verify the authenticity of the received message X, and derive from it the original MESSAGE and a sequence of the signatures of the processors that have signed that message (in the order that they have signed that message with sender's signature being the first signature). |
| T2 | Check for valid signatures: check (1) if the received message has any duplicate messages, and (2) if the number of signatures exceeds F+DIAM(F). |
| T3 | Check for message late arrival: check if the difference between the local time and TIMESTAMP is greater than the minimum of \|SIG\| x (DMAX + TDEL) and BYZT. |
| T4 | Check for message early arrival: check if the local time is smaller than TIMESTAMP - \|SIG\| x DMAX. |
| T5 | Check if same message has been received before: search local history for the existence of a tuple of the form (M,1 or 2) where M's IDENTIFIER is the same as received MESSAGE IDENTIFIER. |
| T6 | Check if it is already determined that the MESSAGE sender is faulty: check if the located tuple is of the form (M,2). |
| T7 | Check if the MESSAGE sender is faulty: check if the value associated with the located tuple is the same as the one associated with the received MESSAGE IDENTIFIER. |

DESCRIPTION OF THE TESTS PERFORMED BY RECEIVE TASK

FIG. 3

THE END TASK

```
1.  TASK SEND ;

2.      GLOBAL:  Φ:  TIME→PROCESSOR-ID→message values ;

3.      VAR t:  time,
4.          msgval:  user message value,
5.          s:  processor-id init(this processor-id),
6.          byzt:  time interval ;

7.      byzt ← F x (DMAX+TDEL) + DMAX + DIAM(F)xTDEL ;

8.      CYCLE ;
9.          LOCAL-RECEIVE (msgval) ;
10.         t ← reading of the current clock ;

11.         SCHEDULE(END task, t+byzt on the clock that
                                            was current at t,t) ;
12.         Φ ← ΦU (t,s,msgval) ;

13.         SEND-ALL (SIGN('new-message',t,s,msgval) ;
14.     ENDCYCLE ;
15. ENDTASK ;
```

A PSEUDOCODE IMPLEMENTATION OF THE SEND TASK

FIG. 5

```
1.  TASK RECEIVE ;

2.      GLOBAL:  Φ:  TIME→PROCESSOR-ID→message values ;

3.      VAR t:  time,
4.          msgval:  user message value,
5.          msg:  signed message,
6.          s:  processor-id init(this processor-id),
7.          p:  processor-id,
8.          lno:  link-id,
9.          SPI:  signature list,
10.         byzt:  time interval ;

11.     byzt ← F x (DMAX+TDEL) + DMAX + DIAM(F)xTDEL ;
12.     CYCLE ;
13.         RECEIVE (lno,msg) ;
14.         (t,SPI,msgval) ←
                AUTHENTICATE(msg)[invalid: 'forgery',ITERATE] ;

15.         [DUPLICATE(SPI): 'duplicates',ITERATE] ;
16.         [|SPI| > F + DIAM(F): 'too many hops',ITERATE] ;

17.         τ ← reading of the clock that was current at t ;
18.         [τ < t - DMAX x |SPI|: 'Too early',ITERATE] ;
19.         [τ > t + min(|SPI|x(DMAX+TDEL),byzt): 'Too late',ITERATE] ;

20.         p ← FIRST(SPI) ;
21.         IF p ε dom(Φ(t)) THEN
22.             [msgval ε dom((Φ(t))(p)): 'already seen',ITERATE] ;
23.             [|(Φ(t))(p)| ≥ 2: 'faulty sender',ITERATE] ;
24.             Φ ← ΦU (t,p,msgval) ;
25.         ELSE
26.             SCHEDULE(END task, t+byzt on the clock
                                    that was current at t,t) ;
27.             Φ ← ΦU (t,p,msgval) ;
28.         FI ;

29.         SEND-ALL-BUT (lno,SIGN('signed-message',s,msg)) ;

30.     ENDCYCLE ;
31. ENDTASK ;
```

A PSEUDOCODE IMPLEMENTATION OF THE RECEIVE TASK

FIG. 6

```
1.  TASK END (t) ;
2.      PARAMETER t:  time ;
3.      GLOBAL:   Φ:  TIME→PROCESSOR-ID→message values ;
4.      VAR s:  processor-id,
5.          p:  processor-id,
6.          m:  message value ;
7.      WHILE (Φ(t) ≠ ∅) DO ;
8.
9.          p ← min (s | s ε dom(Φ(t))) ;
10.         IF |(Φ(t))(p)| = 1 THEN
11.             ACCEPT ((Φ(t))(p)) ;
12.         FI ;
13.         ∀m | m ε dom((Φ(t))(p)) DO ;
14.             Φ ← Φ - (t,p,m) ;
15.         OD ;
16.     OD ;
17. ENDTASK ;
```

A PSEUDOCODE IMPLEMENTATION OF THE END TASK

COMPUTER NETWORK FOR EXAMPLES 1 AND 2

```
1.  TASK SEND ;

2.      GLOBAL:  φ:  TIME→PROCESSOR-ID→message values ;

3.      VAR t:  time,
4.          hc:  integer,
5.          msgval:  user message value,
6.          s:  processor-id init(this processor-id) ;
7.          byzt:  time interval ;
8.
9.      byzt ← F x (DMAX+TDEL) + DMAX + DIAM(F)xTDEL ;

10.     CYCLE ;
11.         LOCAL-RECEIVE (msgval) ;
12.         t ← reading of the current clock ;

13.         φ ← φU (t,s,msgval) ;
14.         SCHEDULE(END task, t+byzt on the clock
                                    that was current at t,t) ;

15.         hc ← 1 ;
16.         SEND-ALL (s,t,hc,msgval) ;
17.     ENDCYCLE ;
18. ENDTASK ;
```

A PSEUDOCODE IMPLEMENTATION OF THE SEND TASK
THAT ONLY TOLERATES TIMING FAULTS

FIG. 9

```
1.  TASK RECEIVE ;

2.      GLOBAL:  Φ:  TIME→PROCESSOR-ID→message values ;

3.      VAR t:  time,
4.          msgval:  user message value,
5.          s:  processor-id init(this processor-id),
6.          p:  processor-id,
7.          lno:  link-id,
8.          hc:  integer,
9.          byzt:  time interval ;

10.     byzt ← F x (DMAX+TDEL) + DMAX + DIAM(F)xTDEL ;

11.     CYCLE ;
12.         RECEIVE (lno,(p,t,hc,msgval)) ;

13.         [hc > F+DIAM(F):  'too many hops',ITERATE] ;

14.         τ ← reading of the clock that was current at t ;
15.         [τ < t - DMAX x hc:  'too early',ITERATE] ;
16.         [τ > t + min(hcx(DMAX+TDEL),byzt):  'too late',ITERATE] ;
17.         [p ε dom(Φ(t)):  'already seen',ITERATE] ;

18.         Φ ← ΦU (t,p,msgval) ;

19.         SEND-ALL-BUT(lno,(s,t,hc+1,msgval)) ;
20.         SCHEDULE(END task, t+byzt on the clock
                                        that was current at t,t) ;

21.     ENDCYCLE ;
22. ENDTASK ;
```

A PSEUDOCODE IMPLEMENTATION OF THE RECEIVE TASK
THAT ONLY TOLERATES TIMING FAULTS

FIG. 10

```
1.  TASK END (t) ;

2.      PARAMETER: t: time ;

3.      GLOBAL:  ϕ:  TIME→PROCESSOR-ID→message values ;

4.      VAR s: processor-id,
5.          p: processor-id ;

6.      WHILE (ϕ(t) ≠ ∅) DO ;
7.          p ← min (s | s ε dom(ϕ(t))) ;
8.          ACCEPT ((ϕ(t))(p)) ;
9.          ϕ ← ϕ - (t,p,(ϕ(t))(p)) ;
10.     OD ;
11. ENDTASK ;
```

A PSEUDOCODE IMPLEMENTATION OF THE END TASK
THAT ONLY TOLERATES TIMING FAULTS

FIG. 11

```
1.  TASK SEND ;

2.      GLOBAL:   Φ:  TIME→PROCESSOR-ID→message values ;

3.      VAR t:  time,
4.          msgval:  user message value,
5.          s:  processor-id init(this processor-id) ;
6.          rmvtime:  time interval ;

7.      rmvtime ← DMAX + DIAM(F)xTDEL ;

8.      CYCLE ;
9.          LOCAL-RECEIVE (msgval) ;
10.         t ← reading of the current clock ;

11.         Φ ← ΦU (t,s,msgval) ;
12.         SCHEDULE(END task, t+rmvtime on the clock
                                    that was current at t,t) ;

13.         SEND-ALL (s,t,msgval) ;
14.     ENDCYCLE ;
15. ENDTASK ;
```

A PSEUDOCODE IMPLEMENTATION OF THE SEND TASK
THAT ONLY TOLERATES OMISSION FAULTS

FIG. 12

```
1.  TASK RECEIVE ;

2.      GLOBAL:  ϕ:  TIME→PROCESSOR-ID→message values ;

3.      VAR t:  time,
4.          msgval:  user message value,
5.          s:  processor-id init(this processor-id) ;
6.          p:  processor-id,
7.          lno: link-id,
8.          rmvtime:  time interval ;

9.      rmvtime ← DMAX + DIAM(F)xTDEL ;

10.     CYCLE ;
11.         RECEIVE (lno,(p,t,msgval)) ;

12.         τ ← reading of the clock that was current at t ;
13.         [τ > t + rmvtime:  'too late',ITERATE] ;
14.         [t ε dom(ϕ)&p ε dom(ϕ(t)):  'already seen',ITERATE] ;

15.         ϕ ← ϕU (t,p,msgval) ;
16.         SEND-ALL-BUT(lno,(s,t,msgval)) ;
17.         SCHEDULE(END task, t+rmvtime on the clock
                                        that was current at t,t) ;

18.     ENDCYCLE ;
19. ENDTASK ;
```

A PSEUDOCODE IMPLEMENTATION OF THE RECEIVE TASK
THAT ONLY TOLERATES OMISSION FAULTS

FIG. 13

```
1.  TASK END (t) ;

2.      PARAMETER:  t:  time ;

3.      GLOBAL:  φ:  TIME→PROCESSOR-ID→message values ;

4.      VAR s:  processor-id,
5.          p:  processor-id ;

6.      WHILE (φ(t) ≠ ∅) DO ;
7.          p ← min (s | s ε dom(φ(t))) ;
8.          ACCEPT ((φ(t))(p)) ;
9.          φ ← φ - (t,p,(φ(t))(p)) ;
10.     OD ;
11. ENDTASK ;
```

A PSEUDOCODE IMPLEMENTATION OF THE END TASK
THAT ONLY TOLERATES OMISSION FAULTS

FIG. 14

```
1.  TASK SEND ;

2.      GLOBAL:  Φ:  PROCESSOR-ID→set of integers ;

3.      VAR msgval:  user message value,
4.          s:  processor-id init(this processor-id) ;
5.          seq:  integer init(0),
6.          rmvtime:  time interval ;

7.      rmvtime ← (DIAM(F)+1)×TDEL ;

8.      CYCLE ;
9.          LOCAL-RECEIVE (msgval) ;
10.         seq ← seq+1 ;
11.         ACCEPT (msgval) ;
12.         SEND-ALL (s,seq,msgval) ;
13.     ENDCYCLE ;
14. ENDTASK ;
```

A PSEUDOCODE IMPLEMENTATION OF THE SEND TASK THAT ONLY TOLERATES OMISSION FAULTS AND DOES NOT NEED CLOCK SYNCHRONIZATION. THE ORDER OF THE MESSAGE ACCEPTANCE, HOWEVER, MAY NOT BE THE SAME BY ALL PROCESSORS.

FIG. 15

```
1.  TASK RECEIVE ;

2.      GLOBAL:  Φ:  PROCESSOR-ID→set of integers ;

3.      VAR msgval: user message value,
4.          s:  processor-id init(this processor-id),
5.          p:  processor-id,
6.          lno: link-id,
7.          seq: integer,
8.          rmvtime: time interval ;

9.      rmvtime ← (DIAM(F)+1)xTDEL ;

10.     CYCLE ;
11.         RECEIVE (lno,(p,seq,msgval)) ;

12.         [seq ε dom(Φ(p)):  'already seen',ITERATE] ;

13.         ACCEPT (msgval) ;
14.         Φ ← ΦU (p,seq) ;

15.         SEND-ALL-BUT(lno,(s,seq,msgval)) ;
16.         SCHEDULE(END task, rmvtime from now,p,seq) ;

17.     ENDCYCLE ;
18. ENDTASK ;
```

A PSEUDOCODE IMPLEMENTATION OF THE RECEIVE TASK THAT ONLY TOLERATES OMISSION FAULTS AND DOES NOT NEED CLOCK SYNCHRONIZATION. THE ORDER OF THE MESSAGE ACCEPTANCE, HOWEVER, MAY NOT BE THE SAME BY ALL PROCESSORS.

FIG. 16

```
1.  TASK END (p,seq) ;

2.      PARAMETER:  t:  time ;

3.      GLOBAL:  Φ:  PROCESSOR-ID→set of integers ;

4.      VAR p:  processor-id,
5.          seq:  integer ;

6.      Φ ← Φ - (p,seq) ;
7.  ENDTASK ;
```

A PSEUDOCODE IMPLEMENTATION OF THE END TASK THAT ONLY TOLERATES OMISSION FAULTS AND DOES NOT NEED CLOCK SYNCHRONIZATION. THE ORDER OF THE MESSAGE ACCEPTANCE, HOWEVER, MAY NOT BE THE SAME BY ALL PROCESSORS.

FIG. 17

FAULT-TOLERANT ATOMIC BROADCAST METHODS

TECHNICAL FIELD

This invention relates to the atomic broadcasting of information in a distributed computing network in the presence of faults, where the processors in the network exchange messages asynchronously.

BACKGROUND OF THE INVENTION

Methods for reliably broadcasting information in a distributed network of processors enable the fault-free components of that system to have consistent views of the global system state in the presence of faulty components. A reliable broadcast method guarantees (1) that a message broadcast is either accepted by all fault-free processors exactly once or by none of them (atomicity), (2) that a message broadcast by a fault-free sender is accepted correctly by all fault-free processors after a known time (termination), and (3) that all messages accepted by fault-free processors are accepted in the same order by all those processors (order). Such a method is an essential part of many protocols for distributed systems, e.g. updating replicated data.

Dolev and Strong, "Authenticated Methods for Byzantine Agreement", SIAM Journal of Computing, Vol. 12, No. 4, November 1983, describe a method for achieving atomic broadcast assuming a (logically) fully-connected network of processors. In order to tolerate F faults, their method runs for (F+1) phases and exchanges $(N-1)^2$ logical messages, where N is the number of processors in the network and the duration of a phase is the maximum network transmission delay.

Reference should also be made to Dolev et al, "A Method for Achieving Multiple Processor Agreement Optimized for No Faults", copending U.S. patent application Ser. No. 06/485,573, filed Apr. 13, 1983 now U.S. Pat. No. 4,569,015. They describe a method for atomic broadcast in a reliable (F+1) connected network of N processors with guaranteed early stopping in the absence of faults, and eventual stopping for $F<(N/2)$ faults.

THE INVENTION

It is the object of this invention to devise a method for reliably broadcasting information in a point-to-point network of processors in the presence of component faults, provided the network remains connected, using exchange of messages. Any such method must possess the following properties: (1) every message broadcast by a fault-free processor is accepted exactly once by all fault-free processors within a bounded time (termination), (2) every message broadcast is either accepted by all fault-free processors or none of them (atomicity), and (3) all messages accepted by fault-free processors are accepted in the same order by all those processors (order).

The objects are satisfied by a machine-implementable method in which each processor maintains an amendable history of broadcast messages, and executes the following steps:

(a) in response to a message broadcast request local to any processor s, processor s assigns to that message a network unique identifier (IDENTIFIER) and a timestamp (TIMESTAMP), adds the message to its local history, signs the message, including the assigned values, and broadcasts the result to its neighbors (two processors are neighbors if they are connected by a direct communication link);

(b) in response to the receipt of a signed message X, each processor p (1) verifies its authenticity and derives from it the original message M and a sequence of signatures of the processors that have signed the message (in the order that they have signed the message with sender's signature being the first signature); and (2) ascertains message validity as to its not being already signed by p, as to its not having duplicate signatures, as to its being nonduplicative of a previously received message, and as to its timeliness; and (c) each processor q within the subset of processors p finding the message M valid performs the further steps of: (1) updating its message history by adding the received message M thereto; (2) signing the received message X and broadcasting the result to its network adjacent neighbors except the processor from whom the message X was received; and (3) after a predetermined amount of time from the time of message origination (whose value depends on the network topology, communication delay, and maximum clock deviation) accepting the message M if it is determined to be valid, and erasing that message from the history.

The following consequences result when the method of this invention is invoked:

(a) If a processor s initiates a broadcast of a message at local clock time t then: (1) if processor s is fault free then every processor p that is fault free during the time interval (t,t+BYZT), where BYZT is a constant, must accept the message by time t+BYZT (termination); and (2) if p and q are fault free during the time interval (t,t+BYZT), then by time t+BYZT either both accept the same message or none of them accepts the message (atomicity).

(b) The messages that are accepted by fault-free processors are accepted in the same order by all those processors (order).

(c) The termination time BYZT is given by $$BYZT = F \times (TDEL + DMAX) + DMAX + (DIAM(F) \times TDEL)$$

where TDEL is the maximum network transmission delay, DMAX is the maximum clock deviation between every pair of processors, and DIAM(F) is the worst case network diameter after F faults.

(d) In the absence of faults, the number of messages sent by this method to perform one broadcast is given by $$2 \times L - (N-1)$$

where N is the number of processors, and L is the number of communication links.

Fundamentally, the method of this invention is based on a diffusion technique for broadcasting information, and on special message validity tests for tolerating any number of component failures up to network partitioning or successful forgery. This method is an advance over methods which simply adopt a diffusion technique for broadcasting in that prior art methods can only tolerate a small subset of the fault class that the method of this invention can tolerate. Further, the method of this invention is also more efficient than the one published by Dolev and Strong in that fewer messages and less time are needed to complete a broadcast.

In order to facilitate appreciation of this invention, it is helpful to consider faults as being of several classes: (1) a fault that causes a component not to respond to a given service request is called an "omission" fault; (2) a fault that causes a component to respond to a given request either too early or too late is called a "timing" fault; and (3) a fault that causes a component to deliver a different response than expected is called a "Byzantine" fault. That is, the set of faults covered by each class is a superset of the one covered by the preceding class, i.e. class 3 includes class 2, and class 2 includes class 1.

In this invention, a method for reliably broadcasting information in a network of message exchanging processors with approximately synchronized clocks is presented which is tolerant of the most general fault class, i.e. the "Byzantine" faults, and remains operable so long as the network is not disconnected by faulty components. Furthermore, it is demonstrated that if the faults to be tolerated are restricted to the less general classes, i.e. "timing" or "omission" faults, then simpler methods can be derived from the general case.

BRIEF DESCRIPTION OF THE FIGURES OF THE DRAWING

FIGS. 1, 2, 3, and 4 exhibit a high-level decision flow of the three tasks comprising the inventive method of which FIG. 1 depicts the SEND task, FIGS. 2 and 3 depict the RECEIVE task, and FIG. 4 depicts the END task.

FIGS. 5, 6, and 7 contain a pseudocode implementation of the respective SEND, RECEIVE, and END tasks.

FIG. 8 depicts a network of processors used in Examples 1 and 2.

FIGS. 9, 10, and 11 exhibit a pseudocode implementation of respective SEND, RECEIVE, and END tasks of the method of this invention tolerating only timing faults.

FIGS. 12, 13, and 14 exhibit a pseudocode implementation of respective SEND, RECEIVE, and END tasks of the method of this invention tolerating only omission faults.

FIGS. 15, 16, and 17 exhibit a pseudocode implementation of respective SEND, RECEIVE, and END tasks of the method of this invention tolerating only omission faults without need of clock synchronization and without guaranty of message order.

DESCRIPTION OF THE PREFERRED EMBODIMENT AND INDUSTRIAL APPLICABILITY

Conditions and Notations

Figure 1:
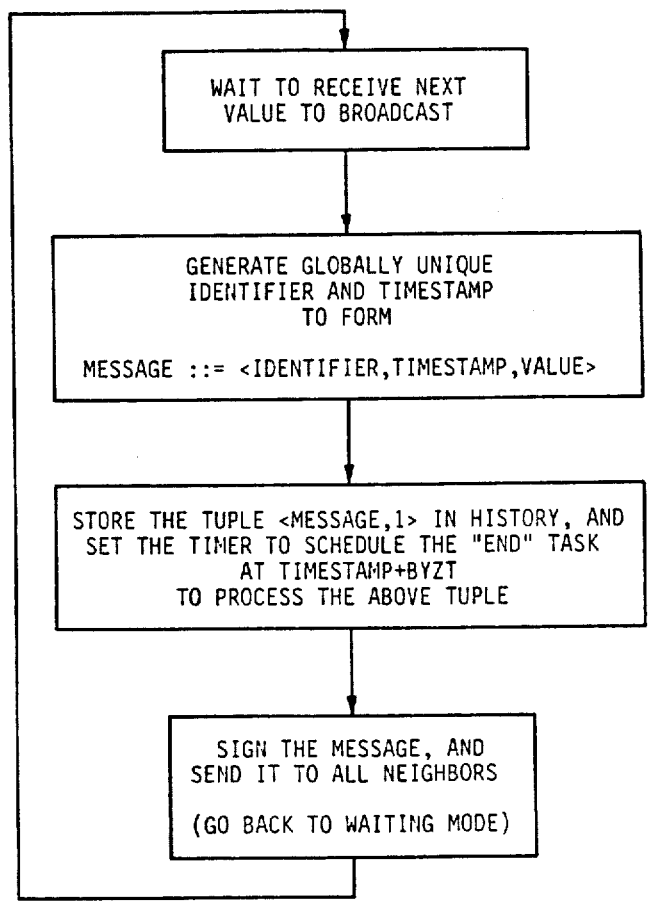
Figure 2:
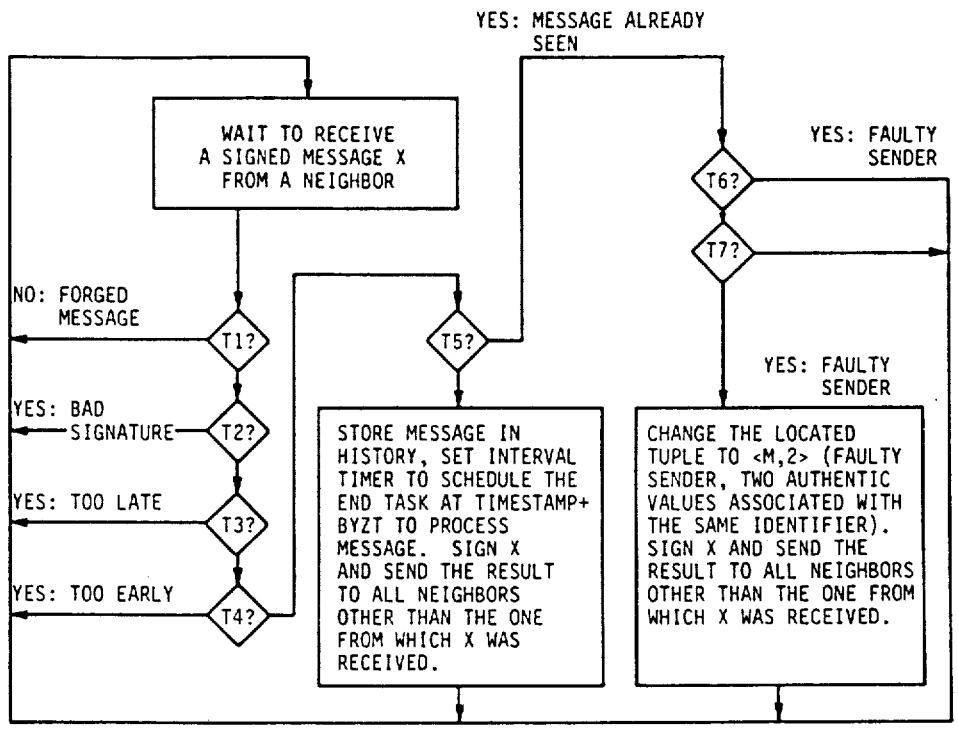
Figure 4:
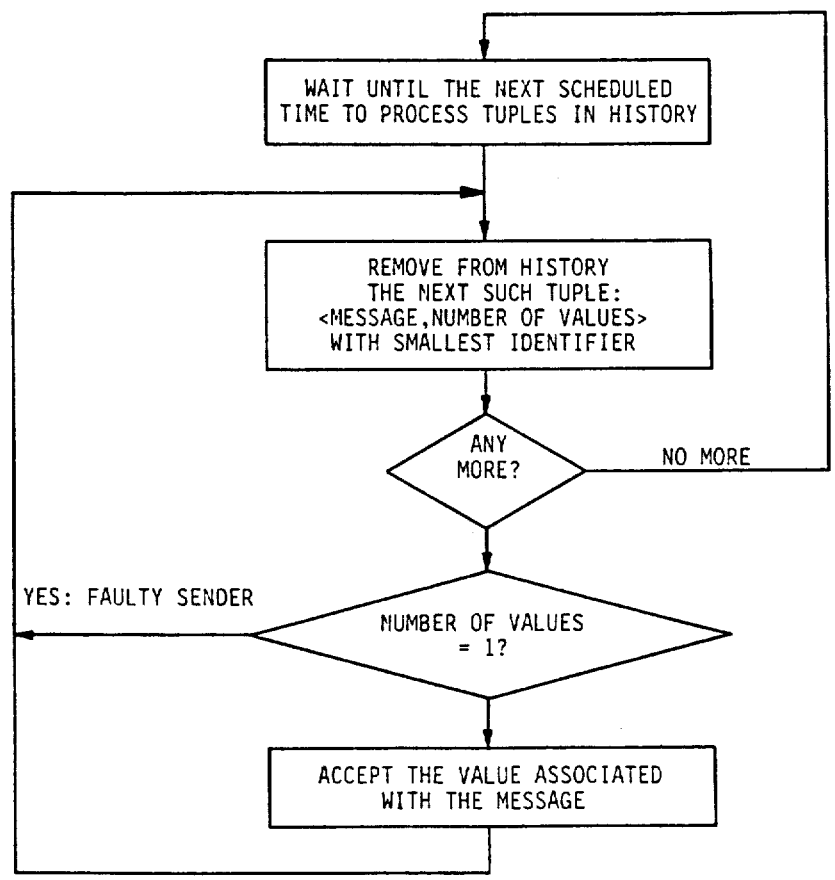

The method presented in this invention is operable in an environment in which:

(a) The processors are connected by a point-to-point communication network.

(b) The clocks of the fault-free processors are synchronized up to a known deviation. That is, the readings of any pair of clocks at any given time cannot differ by more than a known value. This assumption is dropped for a variant of the method that only tolerates "omission" faults. Such a clock synchronization method is presented by Halpern et al, "Centralized Synchronization of Clocks", copending U.S. patent application Ser. No. 06/528,282, filed Aug. 31, 1983.

(c) If two processors and the link joining them are not faulty, then there exists a known upper bound on the time required for a message to be prepared by the sender, transmitted over the link, and processed at the receiving end.

(d) The processors are numbered 1, 2, . . . , N. If processor i intends to send a message m, there is an encoding function $e_i$ such that (1) no processor other than i can generate the message $e_i(m)$, i.e. no message can be forged; and (2) if processor j receives $e_i(m)$, it can decode m and determine that i was the processor that sent the message, i.e. the message can be authenticated. Such an encoding/decoding method is described by Rivest et al, "A Method for Obtaining Digital Signatures and Public-key Cryptosystems", Communications of the ACM, Vol. 21, pp. 120–126, 1978.

In describing the method of this invention, the following notations will be used:

| | |
|---|---|
| F | The number of faults to be tolerated. This is a parameter of the method, and counts both processor and link failures. |
| DIAM(F) | The worst case diameter of the network after the occurrence of F faults. |
| TDEL | The worst case transmission and processing delay from one processor to its neighboring processor over one link. This interval extends from the time the first processor sends the message until the time the receiving processor has processed the message and is ready to send any required response. When messages are sent to all neighbors of a processor, TDEL represents the worst case time from the time the first message is sent until the time the last neighbor has processed the message. |
| DMAX | The worst case deviation of the clocks of the correctly operating processors. |
| BYZT | The time required to complete the atomic broadcast: $BYZT = F \times (TDEL + DMAX) + DMAX + DIAM(F) \times TDEL$. |
| IDENTIFIER | A globally unique identifier for a particular broadcast. |
| TIMESTAMP | An indication of the local clock time at which the broadcast message was prepared. That is, given a TIMESTAMP one can unambiguously determine the clock that was current at the time of that TIMESTAMP. |
| VALUE | The contents of the message to be broadcast. |
| MESSAGE | A message is a tuple of the form (IDENTIFIER,TIMESTAMP,VALUE) |
| HISTORY | A set of tuples of the form (MESSAGE,NUMBER OF VALUES) where NUMBER OF VALUES is an indicator stored with a message in HISTORY which reflects whether more than one VALUE has been associated authentically with the given MESSAGE. (If the NUMBER OF VALUES is 2, then the originator of the message is faulty or the authentication protocol has been compromised.) Observe that given an IDENTIFIER, the associated message can be uniquely located in HISTORY. New tuples may be added to HISTORY, and stored tuples may be deleted from it. |

-continued

| | |
|---|---|
| N | The number of processors in the network. |
| L | The number of communication links. |

The Local Node Execution Environment

As a preliminary, the method of this invention is executable upon a computing system of the type including one or more CPU's, each having a main store, input/output channel, control unit, direct access storage devices, local addressable clocks, and other I/O devices coupled thereto. Such a system is described in Amdahl et al, U.S. Pat. No. 3,400,371, "Data Processing System", issued Sept. 3, 1968. The Amdahl system includes as a resource all of the facilities of either the computing system of an operating system running thereon which are required for the execution of a process including the method of this invention. Typical resources include a main store, I/O devices, the CPU, data sets, interval timer, and control or processing programs. Furthermore, such systems are capable of "multiprogramming". This pertains to the concurrent execution of two or more processes by a computing system, and can be managed on a computer running under an IBM System/370 operating system as described in IBM Publication GC28-6646, July 1973, and listed in IBM System/360 bibliography, GA22-6822. Networks of asynchronously operating CPU's are described in Fitzgerald, U.S. Pat. No. 3,940,743, "Interconnecting Unit for Independently Operable Data Processing Systems", issued Feb. 24, 1976; and Antonaccio et al, U.S. Pat. No. 4,223,380, "Distributed Multiprocessor Communication System", issued Sept. 16, 1980.

Flow Diagram Depiction of Method Execution and Its Task Organization

Referring now to FIGS. 1, 2, 3, and 4, there is exhibited a high-level decision flow of the inventive method. Residing at each processor in the network are three tasks that are running concurrently: the SEND task, the RECEIVE task, and the END task.

The SEND task on each processor s is responsible for initiating the broadcast of messages. Upon receipt of a broadcast request, the SEND task executes the following steps of: (1) generating an IDENTIFIER and a TIMESTAMP for that message, to produce the MESSAGE (IDENTIFIER,TIMESTAMP,VALUE); (2) storing the tuple <MESSAGE,1> in its local HISTORY; (3) setting its local interval timer to schedule the END task at TIMESTAMP+BYZT to accept the MESSAGE VALUE and removing the MESSAGE from HISTORY (observe that by the time TIMESTAMP+BYZT the message should have been received by all fault-free processors); and finally (4) signing the MESSAGE and broadcasting the result to all of its neighbors.

The RECEIVE task on each processor is constantly waiting to receive messages. The main responsibility of the RECEIVE task is to filter out invalid messages, and store each valid message in local HISTORY the first time it is received along with a count of the number of different values that are received with that message IDENTIFIER. Observe that a fault-free sender associates an IDENTIFIER with only one message value, whereas a faulty sender may associate several message values with the same IDENTIFIER. It is only the former kind that must be accepted, while the latter must be discarded.

Specifically, upon receipt of a signed message X from the network by a processor s, the RECEIVE task on that processor verifies its authenticity and derives from it the original MESSAGE and a sequence of signatures of the processors that have signed that message (in the order that they have signed that message with sender's signature being the first signature). If the message is determined to be "forged", it will be discarded. If the message is determined to be "authentic", then the RECEIVE task will execute the following tests: (1) whether the MESSAGE has duplicate signatures; (2) whether the MESSAGE has more signatures than F+DIAM(F), i.e. too many hops; (3) whether the MESSAGE has arrived too early, possibly due to some clock failure; and (4) whether the MESSAGE has arrived too late, possibly due to timing faults. If the answer to any one of the above tests is "yes", then the received message is determined to be invalid and is, therefore, discarded.

Once the message passes all of the above tests, then the RECEIVE task checks if it has already seen this message by consulting its HISTORY. That is, the HISTORY is searched for a tuple (M,NUMBER OF VALUES) such that M's IDENTIFIER is the same as MESSAGE's IDENTIFIER. The search results in one of the following outcomes:

(a) No such tuple is found; this signifies that this MESSAGE is received for the first time and has not been seen before. The RECEIVE task then executes the following steps of: (1) storing the tuple (MESSAGE,1) in the HISTORY to record the fact that MESSAGE has been received already once and has only one value associated with it; (2) setting its local interval timer to schedule the END task at time TIMESTAMP+BYZT to process the MESSAGE (at that time, the END task will remove the MESSAGE from local HISTORY, and accepts the message value there is only one value associated with the MESSAGE); and finally (3) signing the received (signed) message X and broadcasting the result to all of its neighbors except the one from whom the message X was received.

(b) A tuple (M,1) is found such that its associated VALUE is the same as the VALUE associated with the received MESSAGE. This represents the case where another copy of the same message is received again, and may happen since several copies of a message travel the network over different paths and reach the same processor at different times. Since the received MESSAGE has already been seen, it will be discarded.

(c) A tuple (M,1) is found such that its associated value is not the same as the VALUE associated with the received message. This is the clear case of an error: since the tuple (M,1) is located in HISTORY, it is inferred that the MESSAGE has been received previously; the fact that associated VALUES are not the same proves that either the sender had been faulty and had used the same message identifier for two distinct message broadcasts, or the authentication protocol has been compromised. It is therefore determined that MESSAGE is invalid and must not be accepted. In order to achieve this, the following steps are undertaken: (1) the located tuple (M,1) is modified to (M,2) so as to record the invalidity of the message (having at least two associated authentic VALUEs; this will enable the local END task to distinguish the invalid messages and avoid their acceptance); and (2) the received (signed) message X is signed and the result broadcast to all of the neighbors except the one from whom the message X was received. In step (2), processor s signs the MESSAGE and sends it to all of its neighbors except the one from whom the MESSAGE was received. The latter step is necessary to inform other fault-free processors about the invalidity of the MESSAGE.

(d) A tuple (M,2) is found. This is the case where it has already been determined that a MESSAGE is invalid (see the case above). Since all necessary actions have already been taken, the received MESSAGE is simply discarded.

The END task is responsible for accepting valid messages, and removing messages from the HISTORY so as to keep it from growing infinitely large. The END task is normally in a wait mode, and is scheduled by interval timer (set by SEND or RECEIVE tasks). When it is scheduled at some time T, it processes in increasing order of MESSAGE IDENTIFIERs all MESSAGEs that were scheduled for processing at this time, i.e. all MESSAGEs with TIMESTAMP equal to T-BYZT. For each such MESSAGE, the END task removes the tuple (MESSAGE, NUMBER OF VALUES) from the local HISTORY. If the NUMBER OF VALUES portion of the tuple is 1, then the MESSAGE VALUE is valid, i.e. only one authentic value has been received; the END task will accept the MESSAGE. Alternatively, if NUMBER OF VALUES portion is 2 then the message is invalid, either the sender had been faulty or the authentication protocol has been compromised; the message is not accepted.

Observe that for any given MESSAGE, the END tasks of all fault-free processors will process that message at the same clock time TIMESTAMP+BYZT. Also observe that all valid MESSAGEs with the same TIMESTAMP are accepted in the same order by all fault-free processors.

The above three tasks, as shown in FIGS. 1, 2, 3, and 4, are expressible in a high-level programming language. A representation of these tasks written in a high-level specification language is appended to this specification respectively as counterpart FIGS. 5, 6, and 7. The inclusion of these executable tasks is set forth in order to illustrate, by way of example, the ease with which the method of this invention may be practiced by those possessing skill in this art. Other high-level language representations such as PL/I, PASCAL, or ADA might likewise with equal ease and facility have been drawn.

ILLUSTRATIVE EXAMPLES

Example 1

Figures 7, 8:
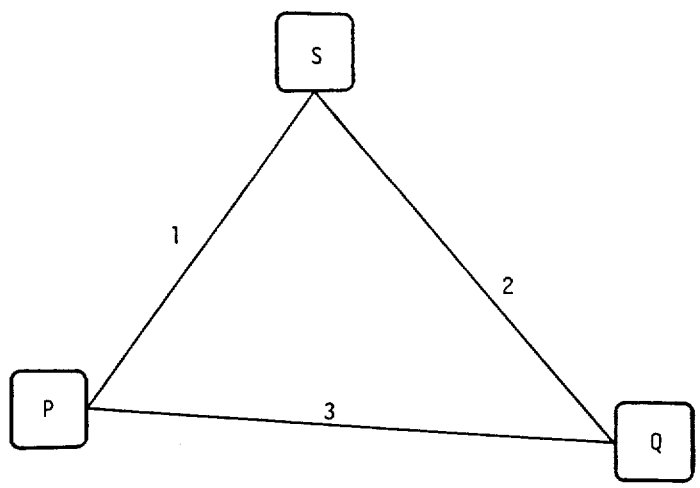

This example exhibits the method's operation in the absence of faults in a network of three interconnected processors as depicted in FIG. 8. All three processors are assumed to be fault free.

(a) At some time $T_0$ on S's clock, S initiates the broadcast of the MESSAGE ::=(ID, $T_0$, VALUE), where ID is a unique message identifier. S stores (MESSAGE,1) in its HISTORY, sets the interval timer to schedule its END task at $T_0$+BYZT, signs the MESSAGE, and broadcasts the resulted message X on links 1 and 3.

(b) At some time $T_1$ on P's clock, where $$T_0-DMAX<T_1<T_0+DMAX+TDEL,$$

processor P receives the message X on link 1, verifies its authenticity and derives from it the original MESSAGE and the sequence of signatures $(\bar{s})$, $\bar{s}$ being processor S's signature. This MESSAGE passes all acceptance tests. P stores the tuple (MESSAGE,1) in its HISTORY, sets its interval timer to schedule its END task at $T_0$+BYZT, signs the received message X, and broadcasts the resulting message Y on link 3.

(c) At some time $T_2$ on Q's clock, where $$T_0-DMAX<T_2<T_0+DMAX+TDEL,$$

processor Q receives the message X on link 2, verifies its authenticity and derives from it the original MESSAGE and the sequence of signatures$(\bar{s})$. (This MESSAGE passes all acceptance tests. Q stores the tuple (MESSAGE,1) in its HISTORY, sets its interval timer to schedule its END task at $T_0$+BYZT, signs the message X, and broadcasts the resulting message Z on link 3.

(d) At some time $T_3$ on P's clock, where $$T_0=DMAX<T_3<T_0+DMAX+(2\times TDEL),$$

processor P receives the message Z on link 3, verifies its authenticity and derives from it the original MESSAGE and the sequence of signatures $(\bar{s},\bar{q})$. This MESSAGE passes all acceptance tests. However, since the tuple (MESSAGE,1) is found in P's HISTORY, P ignores the second receipt of MESSAGE.

(e) At some time $T_4$ on Q's clock, where $$T_0-DMAX<T_4<T_0+DMAX+(2\times TDEL),$$

processor Q receives the message Y on link 3, verifies its authenticity and derives from it the original MESSAGE and the sequence of signatures $(\bar{s},\bar{p})$. This MESSAGE passes all acceptance tests. However, since the tuple (MESSAGE,1) is found in Q's HISTORY, Q ignores the second receipt of MESSAGE.

(f) At time $T_0$+BYZT on S, P, and Q's clocks, the END tasks of all three processors are scheduled. The MESSAGE VALUE is accepted by all three processors, and the tuple (MESSAGE,1) is removed from all three HISTORYs.

Example 2

This example exhibits the method's operation in the presence of faults in a network of three interconnected processors as depicted in FIG. 8. In this example, processors S and P are assumed to be fault free, while processor Q is assumed to be experiencing "timing" faults.

(a) At some time $T_0$ on S's clock, S initiates the broadcast of the MESSAGE ::=(ID,$T_0$,VALUE). S stores (MESSAGE,1) in its HISTORY, sets the interval timer to schedule its END task at $T_0$+BYZT, signs the MESSAGE, and broadcasts the resulting message X on links 1 and 3.

(b) At some time $T_1$ on P's clock, where $$T_0-DMAX<T_1<T_0+DMAX+TDEL,$$

processor P receives the message X on link 1, verifies its authenticity and derives from it the original MESSAGE and the sequence of signatures $(\bar{s})$. This MESSAGE passes all acceptance tests. P stores the tuple (MESSAGE,1) in its HISTORY, sets its interval timer to schedule its END task at $T_0+BYZT$, signs the message X, and broadcasts the resulting message Y on link 3.

(c) At some time $T_2$ on Q's clock, where $$T_0-DMAX<T_2<T_0+DMAX+TDEL,$$

processor Q receives the message X on link 2, verifies its authenticity and derives from it the original MESSAGE and the sequence of signatures ($\bar{s}$). This MESSAGE passes all acceptance tests. Q stores the tuple (MESSAGE,1) in its HISTORY, and sets its interval timer to schedule its END task at $T_0+BYZT$.

Suppose that at this time processor Q is affected by a "timing" fault and becomes inoperable for a long time.

(d) At time $T_0+BYZT$ on the clock of processors S and P, the END tasks of both processors are scheduled. The MESSAGE VALUE is accepted by both processors, and the tuple (MESSAGE,1) is removed from both HISTORYs.

(e) At some time $T_3$, much later after S and P have accepted the MESSAGE VALUE, Q finally becomes operable, signs the message X, and broadcasts the resulting message Z on link 3.

(f) At some time $T_4$ on P's clock, P receives the message Z on link 3, verifies its authenticity and derives from it the original MESSAGE and the sequence of signatures ($\bar{s},\bar{q}$). Since P has already accepted this MESSAGE VALUE, it follows that $T_4>T_0+BYZT$. Therefore, the newly received MESSAGE will be rejected by the test for late message arrival (test T3 of RECEIVE task, see FIGS. 2 and 3); the MESSAGE will be discarded.

The final result in the above example is that the fault-free processors S and P accept the MESSAGE VALUE exactly once.

"Timing" Faults

If the fault class to be handled by the method of this invention is restricted to "timing" faults, then a simpler method can be derived from the method of this invention. Specifically, considerable reduction in complexity results because (1) message authentication is no longer needed, typically a complex operation; (2) there is no longer a need to protect against multi-valued messages; and (3) the tests for bad signatures are replaced by a much simpler test. The simpler method can be derived by making the following changes to the method of this invention:

(a) The format of a MESSAGE is changed to include a count of the processors that have received that message, hereafter referred to as the HOP-COUNT.

(b) In the SEND task, the value of the HOP-COUNT is set to 1 by the MESSAGE originator prior to sending it to all neighbors.

(c) In the RECEIVE task, the value of the HOP-COUNT in a MESSAGE is incremented by 1 by all intermediate processors which receive that MESSAGE prior to sending it to all neighbors.

(d) The format of the HISTORY tuples is changed to <MESSAGE>. The field NUMBER OF VALUES is no longer needed.

(e) A MESSAGE is not signed by the SEND before its transmission, or by the RECEIVE before relaying it.

(f) Test T1 in the RECEIVE task is no longer needed.

(g) Test T2 in the RECEIVE task is changed to "check if HOP-COUNT>F+DIAM(F)".

(h) Test T3 in the RECEIVE task is changed to "check if the difference between the local time and TIMESTAMP is greater than the minimum of HOP-COUNT×(DMAX+TDEL) and BYZT".

(i) Test T4 in the RECEIVE task is changed to "check if the local time is smaller than TIMESTAMP minus HOP-COUNT×DMAX".

(j) Test T5 in the RECEIVE task is changed to "Search the local HISTORY for the existence of a tuple of the form <MESSAGE>".

(k) Tests T6 and T7 in the RECEIVE task are no longer needed.

(l) In the END task, the test "NUMBER OF VALUES=1?" is no longer needed.

For the above-derived method, a representation of the SEND task, the RECEIVE task, and the END task written in a high-level language is appended to this specification respectively as counterpart FIGS. 9, 10, and 11.

"Omission" Faults

If the fault class to be handled by the method of this invention is restricted to "omission" faults, then a yet simpler method can be derived from the method of this invention. Specifically, considerable reduction in complexity results because (1) message authentication is no longer needed, typically a complex operation; (2) there is no longer a need to protect against multi-valued messages; (3) tests for bad signatures are no longer needed; and (4) tests for message timeliness are replaced by a single and very simple test. The simpler method can be derived by making the following changes to the method of this invention:

(a) The format of the HISTORY tuples is changed to <MESSAGE>. The field NUMBER OF VALUES is no longer needed.

(b) A MESSAGE is not signed by the SEND before its transmission, or by the RECEIVE before relaying it.

(c) Tests T1, T2, T3, T4, T6, and T7 in the RECEIVE task are no longer needed.

(d) Test T5 in the RECEIVE task is changed to "Search the local HISTORY for the existence of a tuple of the form <MESSAGE>".

(e) The SEND task schedules the END task at time TIMESTAMP+DMAX+DIAM(F)×TDEL, rather than TIMESTAMP+BYZT.

(f) The RECEIVE task schedules the END task at time TIMESTAMP+DMAX+DIAM(F)×TDEL, rather than TIMESTAMP+BYZT.

(g) In the END task, the test "NUMBER OF VALUES=1?" is no longer needed.

For the above-derived method, a representation of the SEND task, the RECEIVE task, and the END task written in a high-level language is appended to this specification respectively as counterpart FIGS. 12, 13, and 14.

Furthermore, if the order of message acceptance by different processors is not important, then processor clocks need no longer be (approximately) synchronized. Removing this, yet another source of complexity, a simpler method can be derived from the method of this invention by making the following changes:

(a) Synchronized clocks are no longer needed. Each processor requires an interval timer only.

(b) The format of the HISTORY tuples is changed to <MESSAGE>. The field NUMBER OF VALUES is no longer needed.

(c) A MESSAGE is not signed by the SEND before its transmission, or by the RECEIVE before relaying it.

(d) The SEND task accepts a message as soon as that message broadcast request is received.

(e) The SEND task schedules the END task to execute (DIAM(F)+1)×TDEL time units after receiving a message from a local sender (so that it removes that MESSAGE from local HISTORY).

(f) Tests T1, T2, T3, T4, T6, and T7 in the RECEIVE task are no longer needed.

(g) Test T5 in the RECEIVE task is changed to "Search the local HISTORY for the existence of a tuple of the form <MESSAGE>".

(h) The RECEIVE task schedules the END to execute (DIAM(F)+1)×TDEL time units after receiving a MESSAGE from the network (so that it removes that MESSAGE from local HISTORY).

(i) The END task is extremely simplified and performs only one operation of removing MESSAGEs from the local HISTORY.

For the above-derived method, a representation of the SEND task, the RECEIVE task, and the END task written in a high-level language is appended to this specification respectively as counterpart FIGS. 15, 16, and 17.

From the description of the Preferred Embodiment of this invention, those skilled in this art will recognize a variety of applications for the invention and appropriate modifications within the scope of the claims.

What is claimed is:

1. A method for reliably broadcasting information in a point-to-point network of message exchanging processors, each processor having an amendable log, each processor having a clock approximately synchronized to the clocks of the other processors, the time taken for the transmission of messages between arbitrary points in the network and processing thereof being bounded, said method utilizing a selected diffusion technique for broadcasting messages and message validity tests for tolerating any number of component failures up to that number which results in either network partitioning or a successful message forgery, comprising the steps of:
   (a) responive to a message broadcast request originating at any processor s, processor s performing the steps of (FIG. 1):
      (a1) formatting a message M and assigning thereto a network unique identifier and a timestamp;
      (a2) adding the message M to the processor s's log;
      (a3) signing the message M including the asssigned values to form message X; and
      (a4) broadcasting the message X to network adjacent processors of processor s;
   (b) responsive to the receipt of a signed message X by each processor p from a network adjacent processor s, each processor p performing the steps of (FIGS. 2-3):
      (b1) verifying its authenticity and deriving from it the original message M and a sequence of signatures of all previous processors that have signed X in the order that they have signed X with the sender's signature being the first signature; and
      (b2) ascertaining the validity of message M; and
   (c) at each processor q within the set of processors network adjacent to processor s which finds the message M valid, each processor q performing the steps of (FIG. 4):
      (c1) appending the message M to its log;
      (c2) signing the message X;
      (c3) broadcasting said signed message X to its network adjacent neighbors except the processor from whom the message X was received; and
      (c4) after a predetermined amount of time from the time of message origination, accepting the message M if it is determined to be valid.

2. A method according to claim 1, wherein the step of ascertaining message validity includes the steps of determining whether the message is authentic, whether it has not already been signed by processor p, whether it contains duplicate signatures, whether it is nonduplicative of a previsouly received message, and whether it is timely.

3. A method according to claim 1, in which all message broadcasts accepted by fault-free processors are accepted in the same order by all of them.

4. A method for reliably broadcasting information in a point-to-point network of message exchanging processors, each processor having an amendable log, each processor clock being approximately synchronized with the clocks of the other processors, the time for the network transmission of messages and processing being bounded, said method tolerating timing faults of the type wherein network components respond to any given request or message either too early or too late, comprising the steps of:
   (a) responsive to a message broadcast request local to any processor s, processor s performing the steps of:
      (a1) formatting a message M and assigning to said message a network unique identifier, a timestamp, and a counter initialized to 1;
      (a2) adding the message M to its local log; and
      (a3) broadcasting the message M including the assigned values to the network adjacent processors of processor s;
   (b) responsive to the receipt of a message by each processor p from a network adjacent processor s, each processor p performing the step of ascertaining message validity as to its being nonduplicative of a previously received message and as to its timeliness; and
   (c) at each processor q within the set of network adjacent processors which finds the message M valid, each processor q performing the steps of:
      (c1) appending the message M to its log;
      (c2) incrementing the counter by 1 and broadcasting the message M to the network adjacent neighbor processors except the processor from whom the message was received; and
      (c3) after a predetermined amount of time from the time of message origination, accepting the message M and erasing it from the local log.

5. A method according to claim 4, in which all message broadcasts accepted by fault-free processors are accepted in the same order by all of them.

* * * * *